US006668809B2

(12) United States Patent
Lowi, Jr. et al.

(10) Patent No.: US 6,668,809 B2
(45) Date of Patent: Dec. 30, 2003

(54) STATIONARY REGENERATOR, REGENERATED, RECIPROCATING ENGINE

(76) Inventors: Alvin Lowi, Jr., 2146 Toscanini Dr., Rancho Palos Verde, CA (US) 90275; Allan J. Ferrenberg, 255 Rimrock Dr., Swall Meadows, Bishop, CA (US) 93514

( * ) Notice: Subject to any disclaimer, the term of this patent is extended or adjusted under 35 U.S.C. 154(b) by 0 days.

(21) Appl. No.: 09/989,499

(22) Filed: Nov. 19, 2001

(65) Prior Publication Data

US 2003/0094164 A1 May 22, 2003

(51) Int. Cl.[7] .............................................. F02B 47/00
(52) U.S. Cl. ....................................................... 123/543
(58) Field of Search ............................ 123/543, 51 R; 60/712

(56) References Cited

U.S. PATENT DOCUMENTS

| 155,087 | A | | 9/1874 | Hirsch |
|---|---|---|---|---|
| 2,239,922 | A | | 4/1941 | Martinka |
| 3,777,718 | A | | 12/1973 | Pattas |
| 3,871,179 | A | | 3/1975 | Bland |
| 3,923,011 | A | | 12/1975 | Pfefferle |
| 4,004,421 | A | | 1/1977 | Cowans |
| 4,074,533 | A | | 2/1978 | Stockton |
| 4,280,468 | A | | 7/1981 | Millman |
| 4,630,447 | A | * | 12/1986 | Webber ........................ 60/712 |
| 4,790,284 | A | | 12/1988 | Ferrenberg et al. |
| 4,928,658 | A | | 5/1990 | Ferrenberg et al. |
| 5,375,567 | A | | 12/1994 | Lowi, Jr. |
| 5,465,702 | A | | 11/1995 | Ferrenberg |
| 5,499,605 | A | * | 3/1996 | Thring ........................ 123/543 |
| 5,507,253 | A | | 4/1996 | Lowi, Jr. |
| 5,632,255 | A | | 5/1997 | Ferrenberg |
| 5,740,782 | A | | 4/1998 | Lowi, Jr. |
| 5,799,629 | A | | 9/1998 | Lowi, Jr. |
| 5,938,124 | A | | 8/1999 | Lowi, Jr. |
| 6,089,195 | A | | 7/2000 | Lowi, Jr. |
| 6,279,520 | B1 | | 8/2001 | Lowi, Jr. |
| 6,340,004 | B1 | * | 1/2002 | Patton ........................ 123/543 |

OTHER PUBLICATIONS

Lowi, Jr. et al.; A New Approach to the Design of a Diesel Engine for General Aviation Aircraft Propulsion; Society of Automotive Engineers 1998; Paper No. 00GATC–45; pp. 1–13.
Addoms; Evaluation of an Unconventional Diesel Engine as a General Aviation Powerplant: Society of Automotive Engineers 1998; Paper No. OOGATC–31; pp. 1–6.
Ruiz et al.; New Experiments & Computations on the Regenerative Engine; SAE paper; 1993; pp. 1–12.
Chrjapin; Combustion Modeling of a Two Cylinder Cycle Reciprocating Engine; Feb. 1984.

\* cited by examiner

Primary Examiner—Marguerite McMahon
(74) Attorney, Agent, or Firm—Bruce M. Canter; Stradling Yocca Carlson & Rauth

(57) ABSTRACT

An improved, internal combustion, reciprocating engine employs thermal regeneration to improve its efficiency and power. Regeneration is accomplished through the use of an alternating flow heat exchanger. In one embodiment the engine consists of one or more cylinders containing a pair of opposed pistons, a hot piston and a cold piston separated by a stationary regenerator. The engine is equipped with means to introduce gaseous or liquid fuel into said hot volume, means to introduce fresh working fluid and means to remove exhaust gases from the cold volume. In one embodiment one or more exhaust ports permitting the flow of exhaust fluid out of the cylinder are located between a cold piston and the thermal regenerator and one or more intake ports permitting the flow of fresh working fluid into the cylinder are located between the cold piston and the exhaust ports. The engine can provide greater expansion than compression and can provide critical and substantial improvements over previous engines.

29 Claims, 7 Drawing Sheets

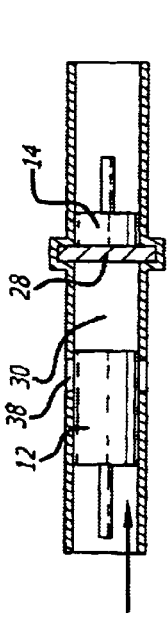
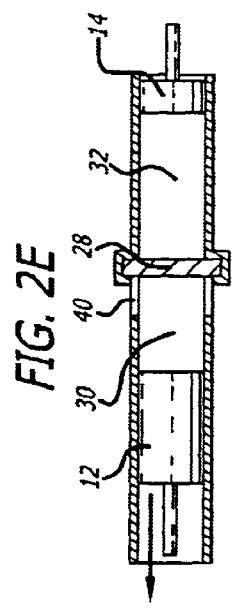
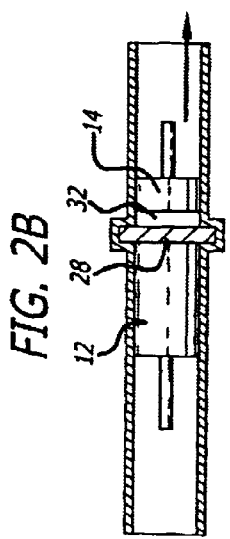
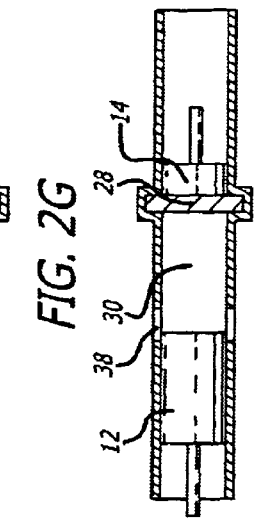
FIG. 2A  FIG. 2B  FIG. 2C  FIG. 2D
FIG. 2E  FIG. 2F  FIG. 2G  FIG. 2H

STATIONARY REGENERATOR, REGENERATED, RECIPROCATING ENGINE

FIELD OF INVENTION

This invention relates to an improved, internal combustion, reciprocating engine. The engine employs thermal regeneration to improve its efficiency and power. Regeneration is accomplished through the use of an alternating flow heat exchanger, hereafter referred to as the regenerator and sometimes called a recuperator. The engine consists of one or more cylinders containing a pair of opposed pistons separated by a stationary regenerator. The pistons are suitably connected to one or more power output shafts. The volume on one side of the regenerator, i.e., between the regenerator and one of the pistons, is referred to as the hot volume. The volume between the regenerator and the other piston is referred to as the cold volume. The engine is equipped with a means to introduce gaseous or liquid fuel into said hot volume. Means are also provided to introduce fresh working fluid and to remove exhaust gases from the cold volume. This engine performs a thermodynamic cycle approximated by a regenerated Otto or diesel cycle. It can provide greater expansion than compression, and other operating features that are unique, and provides critical and substantial improvements over previous engines.

BACKGROUND OF THE INVENTION

Thermal regeneration is the capturing of thermal energy from a thermodynamic cycle (or a heat engine operating on some thermodynamic cycle) and the utilization of that energy within the cycle or engine to improve the cycle or engine's performance. This is commonly done with many heat engines, including Stirling engines, gas turbines, and Rankine cycle devices. In a gas turbine, consisting of a compressor, combustor, and turbine, the temperature of the air leaving the turbine is often greater than the temperature of the air leaving the compressor. If the energy in the turbines exhaust can be transferred to the air leaving the compressor, it will not be necessary to add as much heat (fuel) in the combustor to raise the air temperature to the desired turbine inlet temperature. This means that the same work is accomplished, but less fuel is employed. Therefore, the specific fuel consumption of such a thermally regenerated gas turbine is improved. Thermal regeneration of gas turbines is commonly accomplished by the use of alternating flow heat exchangers that transfer energy from the exhaust gases to the compressed air.

In principle, any internal combustion engine can be thermally regenerated. This can be done by transferring heat from the gases at the conclusion of the expansion stroke to the gases of the next cycle at the conclusion of the compression stroke. The benefits that can be attained thereby are substantial. Fuel consumption is reduced in a manner similar to that of the regenerated gas turbine.

In addition, a regenerated internal combustion engine is thermodynamically capable of providing higher gas temperatures, which results in even greater improvements in efficiency and power. Since reciprocating engines only experience these higher temperatures for brief times, they can withstand these higher temperatures to some extent. Thus the benefits of regeneration are even greater for an internal combustion engine than they are for the temperature limited gas turbine. The advantages of thermally regenerated gasoline or diesel engines are readily apparent and quite substantial. Unfortunately, viable and effective means by which this can be accomplished have not previously been disclosed or developed.

Like the regenerated gas turbine the regenerative heat transfer in an internal combustion engine, such as a reciprocating engine, can best be accomplished through the use of an alternating flow heat exchanger. This approach is commonly applied in the externally combusted Stirling engines and has been proposed in a variety of forms for regenerated, internal combustion, reciprocating engines. There are two basic approaches: (1) force the working fluid to pass through a stationary regenerator, or (2) move the regenerator through the gas.

Many inventors in this field have taken the former approach—i.e., a stationary regenerator. This has led to a number of approaches such as those found in U.S. Pat. No. 155,087 to Hirsch, U.S. Pat. No. 2,239,922 to Martinka, U.S. Pat. No. 3,777,718 to Pattas, U.S. Pat. No. 3,871,179 to Bland, U.S. Pat. No. 3,923,011 to Pfefferle, U.S. Pat. No. 4,004,421 to Cowans, U.S. Pat. No. 4,074,533 to Stockton, U.S. Pat. No. 4,630,447 to Webber, SAE paper 930063, by Ruiz, 1993, and Carmichael (Chrjapin Master's thesis, MIT, 1975). All of these approaches involve at least two cylinders, generally one in which compression occurs and a second where the combustion and expansion occur. In the flow passage connecting these cylinders, or in one of the cylinders, there is a stationary permeable material that comprises the regenerator. The regenerator is the alternating flow heat exchanger. The expanded combustion gases are passed through the regenerator and transfer thermal energy to it. During the next cycle compressed air is forced through the regenerator thereby absorbing this energy. Thus heat is transferred from the hot exhaust gases to the compressed air—the essence of thermal regeneration.

Unfortunately, none of these earlier approaches for utilizing a stationary regenerator to accomplish a regenerated, internal combustion reciprocating engine have been successful. This is due to a number of causes which were not apparent to the previous inventors, including, the poorer computing capabilities generally available to them, the extensive time required to properly analyze such engines, or both. We have developed detailed computer models of regenerated engines that provide new insight into the processes occurring and which validate the improved regenerated engine disclosed herein.

The primary difficulty with these earlier stationary regenerator engine designs is that they do not have the capability to move the gas through the regenerator at the appropriate times during the cycle. This can be critically important and make all the difference between an engine that will barely run and one that has high fuel economy and power density. One of the primary, novel features of this invention is that it recognizes and specifies near optimum motion of the pistons. It also provides a means by which such motion can be accomplished.

In one of the most promising of the early regenerated engine designs, a single cylinder is divided into two sections by a stationary regenerator. The regenerator is a porous, high temperature material in the shape of a disc having a diameter equal to the cylinder bore. The cylinder ends are closed by pistons which are connected by drive mechanisms to the power output shaft. The volume between one piston and the regenerator is referred to as the cold volume and has adjacent means for the exchange of working fluid within that cold volume. The volume between the regenerator and the other volume is referred to as the hot volume and has adjacent means to inject fuel into the hot volume. The piston in the hot volume is referred to as the hot piston and the piston in the cold volume is referred to as the cold piston.

In stationary regenerator engines, the working fluid is forced through the regenerator by the actions of the pistons.

Engine performance is very highly dependent upon the exact schedule of the pistons' motions. None of the previous inventors of regenerated engines has proposed a mechanism that could provide the required piston motions. Also, none of the previous inventors has specified the required piston motions in sufficient detail to allow an appropriate drive mechanism to be selected or developed. U.S. Pat. No. 3,777,718 to Pattas, for example, discloses a conventional crank and eccentric arrangement as a piston drive mechanism for controlling piston positions in the engine. It is not possible for such a mechanism to provide the very unusual and non-sinusoidal type of motion required by the regenerated cycle. A far more flexible design approach is required for the piston drive mechanism, as will be discussed hereinbelow.

One such exemplary embodiment for controlling the piston motion is an engine having a barrel cam, alternatively known as an axial cam or a cylindrical cam. An opposed piston cam engine that is useful for this purpose is disclosed in U.S. Pat. No. 5,375,567 to Lowi, which is incorporated by reference in its entirety as if disclosed herein.

In addition to being unable to provide or specify satisfactory piston motion, many of the earlier designs specified incorrect or poorer performing motions for the pistons. For example, Pattas proposes that after the hot gases have expanded on the hot side, the hot piston should be moved so that the hot gases are forced back through the regenerator. Then, "as the working medium builds up in the cylinder of the cold gas section, the cold piston is moved outward from the regenerator to expand the cold gas section". Our analyses clearly show that this type of motion results in very poor performance. It is much more advantageous to fully expand the gas by moving the cold piston to a position near to its full outward position and to "blow down" the cylinder prior to the hot piston's inward stroke. The engine disclosed herein avoids this failure by providing near optimum motions of the pistons and by providing a piston drive mechanism that can accomplish these motions.

Finally, the engine disclosed herein has an inherent ability to provide greater expansion than compression, a process sometimes referred to as a "Miller Cycle," more generally known as the more-complete-expansion cycle. This feature can dramatically improve fuel efficiency and power.

SUMMARY OF THE INVENTION

This invention is an internal combustion, reciprocating, regenerated engine made up of a number of similar working units, often referred to as cylinders. Each working unit is comprised of a cylinder that is closed at each end by a movable piston that is connected to a power output shaft. Means are provided to permit and control the flow of working fluid into and out of the cylinder and to inject fuel into the cylinder. An alternating flow heat exchanger, called a regenerator, is located within the cylinder, between the pistons. The pistons are moved in such a manner, and other means are provided, so that the following processes will occur: (1) compression of the working fluid, (2) regenerative heating of the working fluid, (3) combustion within the heated working fluid, (4) expansion of the working fluid, (5) regenerative cooling of the working fluid, and (6) exchange of a portion of the working fluid. These processes occur in sequential fashion, with some degree of overlap. The primary and most unique feature of this invention is that these processes occur in the appropriate manner and timing so as to provide optimum power and fuel efficiency.

One embodiment of this invention utilizes a barrel cam as a means by which the pistons can be moved in the unusual manner required by the thermodynamic cycle of this engine.

OBJECTS OF THE INVENTION

The primary object of this invention is to provide a highly efficient, regenerated, internal combustion engine.

Another object of this invention is to provide an engine with very high brake mean effective pressure.

Another object of this invention is to exploit the high payoff to be obtained from regenerating an Otto or diesel cycle engine.

Another object of this invention is to exploit the high degree of freedom in piston motion that is attainable with a barrel cam, thereby providing the highly unconventional piston motion required by the regenerated engine.

Another object of this invention is to provide a regenerated engine employing a stationary regenerator in which the pistons' motions are designed to provide good performance.

Other objects, advantages, and novel features will become apparent from the following detailed description of the invention when considered in conjunction with the accompanying drawings.

DESCRIPTION OF DRAWINGS

FIG. 2 depicts the operating sequence for the embodiment of FIG. 1;

DETAILED DESCRIPTION OF THE INVENTION

This invention is a regenerated, reciprocating, internal combustion engine employing a stationary regenerator. This engine can operate with a conventional gas exchange cycle comprising the processes of gas exchange, compression, regenerative heating, expansion, and regenerative cooling. This engine can also operate with an enhanced gas exchange cycle performing the same processes wherein the gas exchange process utilizes separate intake and exhaust processes.

The working fluid that is anticipated for use in the illustrative embodiment of this engine is air; however, any mixture of gases and liquids that can undergo an exothermic chemical reaction with the fuel can be used. The fuel may be any solid, liquid (e.g., diesel fuel or gasoline), or gaseous fuel (e.g., natural gas or propane) that can react with the working fluid.

Figure 1:
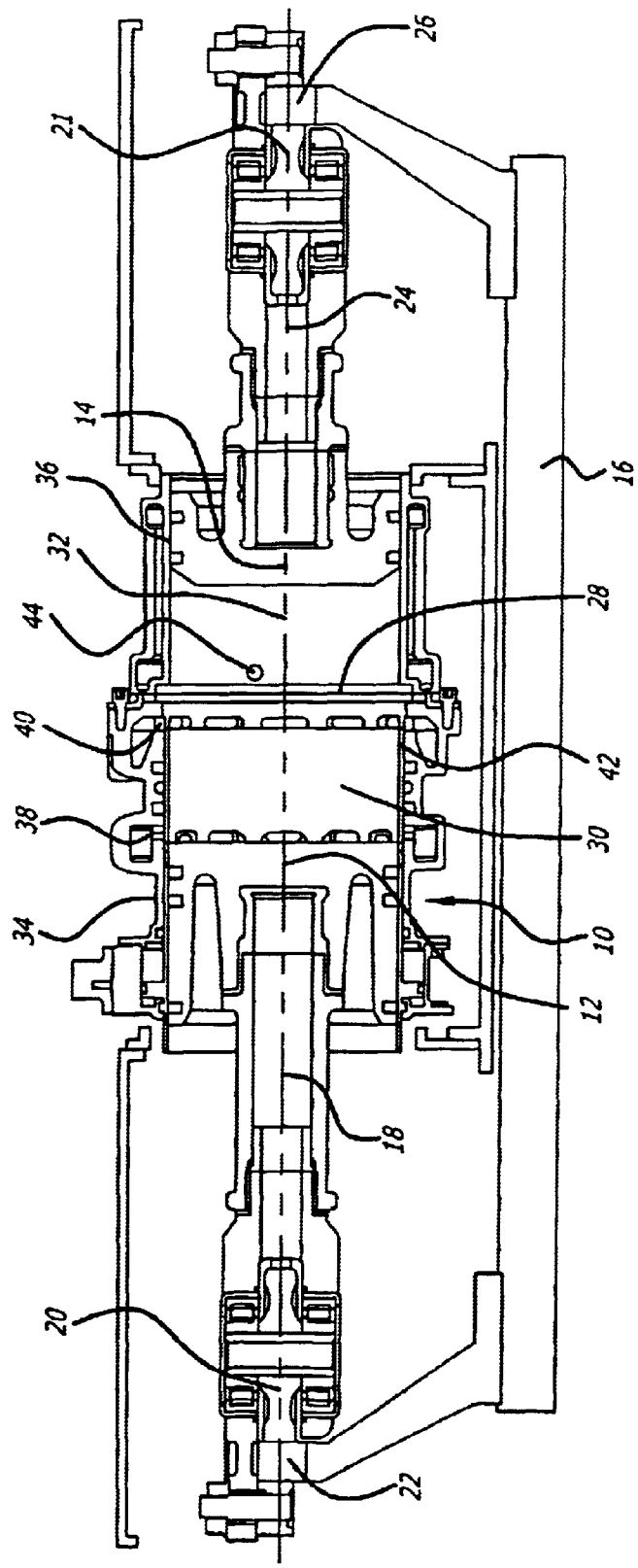
FIG. 1 is a schematic illustration of a cross section of a single cylinder of a first illustrative embodiment of the present invention.

FIG. 1 illustrates a first embodiment of this invention comprising a single cylinder 10 of this engine which utilizes a gas exchange process during which there is very little motion of the cold piston. The cylinder 10 is closed at both ends by opposed pistons 12 and 14. The first, cold piston 12 is connected to a power output shaft 16 by a piston rod 18 and an appropriate drive mechanism for converting the linear motion of the cold piston 12 to the rotating motion of the power output shaft 16. In the illustrated embodiment, the drive mechanism is comprised of the piston rod roller assembly, which includes roller follower 20, and the barrel cam 22. The roller follower 20 is a rolling elements (e.g., a wheel) that rolls along the outer surface or rim of the barrel cam 22. This rim of the barrel cam 22 varies in its axial position along the periphery of the barrel cam 22, thereby providing for varying positioning of the piston 12. Other ways known to those of skill in the art could also be used to convert the linear motion of piston 12 to rotating motion of shaft 16 and such variations in the drive mechanism are encompassed within the general concept of the invention.

The second, hot piston 14 is connected to power output shaft 16 by another piston rod 24 and a like drive mechanism for converting the linear motion of the hot piston 14 to the rotating motion of the power output shaft. In the illustrated embodiment this drive mechanism is comprised of the piston rod roller assembly 21 and the barrel cam 26.

It should also be apparent that the drive mechanism for the hot and cold pistons need not be the same. For example, a barrel cam may be employed for one piston and an alternative drive mechanism employed for the other. The difference in hot and cold piston motions and loads might make such an approach desirable.

The cylinder is divided into two parts by the regenerator 28. The regenerator is a porous material so arranged in the cylinder that any working fluid that travels from one side of the regenerator to the other side of the regenerator must pass through said regenerator. The changeably sized volume between the cold piston 12 and the regenerator 28 is referred to as the cold volume 30. The changeably sized volume between the regenerator 28 and the hot piston 14 is referred to as the hot volume 32. The portion of the cylinder around the cold volume 30 is referred to as the cold cylinder 34 and the portion of the cylinder around the hot volume is referred to as the hot cylinder 36.

Means for the inflow and outflow of the working fluid are provided by one or more intake ports 38 and exhaust ports 40, respectively. In the exemplary embodiment of FIG. 1, an exhaust port 40 can be opened and closed by a sleeve valve 42. As will be discussed below, in some embodiments the exhaust port 42 can be opened and closed by being covered and uncovered by the cold piston 12. The intake port 38 is opened and closed by being covered and uncovered by the cold piston 12, or by ports in the sleeve valve, or both. The intake port 38 is connected to a source of fresh working fluid and may be pressurized by a turbocharger, supercharger, or crankcase compression means commonly applied to smaller two stroke engines. Other valving mechanisms to permit the appropriately timed introduction of fresh working fluid into the cylinder and to permit the removal of exhaust gases, such as poppet valves, rotary valves, slide valves, butterfly valves, sleeve valves, or ball valves can also be utilized. These valving mechanisms will communicate with the cold volume 30 through the cylinder wall or the piston. Sleeve valves located external to the cylinder wall and sleeve valves that rotate, reciprocate, or both can also be applied.

Ported designs wherein static ports controlled entirely by the cold piston are also feasible. One such example is generally known in the two-stroke cycle engine art as "loop" scavenging. Such porting may employ external valves on either or both the intake and exhaust headers to further optimize the timing of the flow. For example, automatic one-way reed valves may be incorporated in the inlet duct to allow flow to pass when the inlet port is open and only when the intake pressure exceeds the cylinder pressure, thereby preventing exhaust backflow. Another example is what is known in the art as MAN scavenging in which the exhaust port is taller than the intake port so that it is opened by the piston earlier in its outward stroke to allow the exhaust gas to blow down through the exhaust manifold before the intake system is exposed to cylinder pressures. Then, to prevent excess scavenge air flow and allow supercharging of the cylinder, the exhaust port is closed before the piston arrives to close it by an external, mechanically operated valve such as a butterfly or rotary valve. Finally, since the axial forces acting on the cylinder are small, it is feasible to "break" the cylinder in the cold volume such that it can be pulled apart when desired to provide an opening for the exchange of gases.

The hot cylinder 14 has means to introduce fuel into it, such as one or more fuel injectors 44 mounted on it so as to introduce finely dispersed fuel into the hot volume 32 at the appropriate times during the engine cycle. The hot volume 32 of the exemplary embodiment will typically be much hotter than a conventional diesel or gasoline engine. Because of these high temperatures and consequent heat losses, it may be advantageous to apply a thermal barrier on the face of the hot piston 14, on the walls of the hot cylinder 36, or both. These thermal barriers can consist of coatings, plates, sheets or other structures made of materials that can withstand high temperatures and that have low thermal conductivity. Ceramics, such as zirconia, are examples of thermal barrier materials which can be used. The hot piston and hot cylinder can also be cooled.

The cylinder does not have to be of constant cross-section. That is, the inside diameter of the hot cylinder 36 need not be the same as the inside diameter of the cold cylinder 34. Also, the strokes of the two pistons 12 & 14 will typically not be the same. Finally, it is not even necessary for the axes of the cylindrical hot and cold volumes to be axially aligned. That is, the cylinder can be bent at the regenerator location so that it now consists of two, non-axially aligned cylinders that are joined at their ends with this joining section containing a regenerator. Finally, it is not necessary for the regenerator to be precisely disc shaped. The regenerator could be bowed in one direction, i.e., have a convex/concave shape, or it could have a conical or other shape. However, it is preferable for the surface of the piston faces to match the closest face of the regenerator, so that at each piston's inwardmost position the volume between the regenerator and the piston is minimized.

FIGS. 2A through 2H present the set of processes that comprise the conventional gas exchange cycle of this engine. These figures are based upon the engine design illustrated in FIG. 1. The sleeve is not shown in these FIG. 2A to 2H sketches and the ports are only shown when open or referred to. However, those skilled in the art will appreciate how the sleeve is utilized to open and close the ports. Other design approaches, such as different diameter cylinders encompassing the hot and cold volumes 30 and 32, or different valving approaches, can be utilized without changing these basic processes or departing from the inventive concept. In reality, due to mechanical limitations, there will typically be some overlap in these processes. In the following discussion of this figure, the term inward refers to motion toward the regenerator, while the term outward refers to motion away from the regenerator.

FIG. 2A presents the engine configuration at the start of the compression stroke. The cold piston 12 has just started to move toward the regenerator 28. The intake port 38 has just been closed by covering it with the piston, the sleeve, or both, and the exhaust port 40 has just been closed by the sleeve. The exact and optimum timing and order of the closing of these ports is dependent upon the intake and exhaust manifold pressures and other factors. The hot piston 14 is close to the regenerator 28. At its closest position to the regenerator 28 there is only a small gap, as necessary for the tolerance variations in the engine components, separating the hot piston 14 from the regenerator 28.

In FIG. 2B, the cold piston 12 has moved to a position close to the regenerator 28 while the hot piston 14 has remained nearly stationary at, or very near to, its closest position to the regenerator 28. This is the time of maximum gas compression in the cylinder. The cold piston 12 position at this time of maximum compression can be the limit of its inward travel (i.e., its minimum separation from the regenerator 28), or, depending upon the desired compression ratio, can be slightly outward from that position.

Between FIGS. 2B and 2C, the cold piston 12 continues its inward motion, if it is not already at its closest distance to the regenerator 28, and the hot piston 14 begins to move away from the regenerator 28. This forces the compressed working fluid to pass through the regenerator 28, from the cold volume 30 to the hot volume 32, and absorb energy from the hot internal surfaces of the regenerator 28. This is referred to as the regenerative heating process. During this regenerative heating process fuel injection into the hot volume 32 begins. In FIG. 2C the cold piston 12 has reached its closest position to the regenerator 28, with only a small gap, as necessary for the tolerance variations in the engine components, separating it from the regenerator 28.

The cold piston 12 then remains nearly stationary and the hot piston 14 continues its motion away from the regenerator 28, expanding the hot volume 32 as shown from FIG. 2C to 2D and then to 2E. Sometime shortly after fuel injection begins (FIG. 2D), the very high temperature of the working fluid in the hot volume 32 causes the fuel to ignite. As the fuel is consumed the hot piston 14 moves outward to its maximum separation from the regenerator 28. This is the hot side expansion or hot piston power stroke. The end of this hot side expansion is depicted in FIG. 2E.

The next step highlights one of the advantages of the present invention. In other regenerated engines (for example—Pattas) the hot piston will be moved toward the regenerator while, simultaneously, the cold piston is moved away from the regenerator. Our analyses indicate that this approach does not maximize engine fuel economy. It is preferable to more fully expand the working fluid by maintaining the hot piston 14 nearly stationary at its outward-most position and moving the cold piston 12 to its outward-most position, as is shown between FIG. 2E and FIG. 2F. However, the present invention does not specifically depend on only this hot and then cold piston expansion process, as there may be some applications or engine operating conditions (e.g., very lightly loaded engines) in which the simultaneous piston motion expansion process will be preferred.

The rationale for utilizing the aforementioned approach of fully expanding the working fluid in certain applications of the exemplary embodiment will be clear from the following. After the hot side expansion (FIG. 2E), there is still substantial pressure in the cylinder. If the hot piston 14 is now moved inward (toward the regenerator) while the cold piston 12 is moving outward (away from the regenerator), then the hot piston 14 will be removing work from the shaft while the cold piston 12 is adding it. If, however, the cold piston 12 moves first, work will be extracted from the working fluid and transferred to the shaft. As the cold piston 12 approaches its outward-most position (FIG. 2F), the exhaust valve 40 opens and blowdown occurs. After the pressure in the cylinder has been reduced by the cold side expansion and the blowdown, the hot piston 14 is moved toward the regenerator 28. Since the pressure is now much lower the engine work required to move the hot piston 14 inward is smaller. Thus more net work is extracted. This set of processes also provides what is commonly referred to as a "Miller cycle", whereby the working fluid undergoes an expansion that is greater than the compression, which further improves performance.

FIG. 2F shows the exhaust ports 40 which are opened as the cold piston 12 nears its outward position. This results in the blowdown of the cylinder gases. During the expansion in the cold volume 30 and during blowdown some of the working fluid travels from the hot volume 32 to the cold volume 30, passing through the regenerator 28. As it passes through the gas transfers thermal energy to the regenerator 28. This is referred to as the first part of the regenerative cooling process. This motion of the cold piston 12 depicted between FIGS. 2E and 2F is also referred to as the cold side expansion.

Between the positions depicted in FIGS. 2F and 2G, the hot piston 14 moves from its outward position to its most inward position, adjacent to the regenerator 28. This motion results in additional mass flow through the regenerator 28 and heat transfer to it, and this hot piston stroke is referred to as the second part of the regenerative cooling process. Before or while the hot piston 14 performs this stroke, the intake ports 38 are opened and scavenging begins. During scavenging, a portion of the working fluid is forced out of the exhaust ports 40 and replaced with fresh working fluid from the intake port 38.

It may also be advantageous to utilize a supercharging process after the termination of scavenging. This process is shown in FIG. 2H wherein the exhaust ports 40 is closed and the cylinder is thereby pressurized from the intake port prior to closing the intake ports 38. Alternatively, it may be satisfactory or desirable to close both intake port 38 and exhaust port 40 more nearly simultaneously. Whether this is advantageous depends upon the relative pressures in the intake and exhaust manifolds, the timing capabilities of the valves or sleeve, and other factors. If intake manifold pressure is much higher than exhaust manifold pressure it will generally be advantageous to supercharge the cylinder.

Whether or not the cylinder is supercharged, both ports are closed near the beginning of the cold pistons inward stroke (the compression stroke). Thus we have completed the cycle and returned to FIG. 2A.

Figure 3:
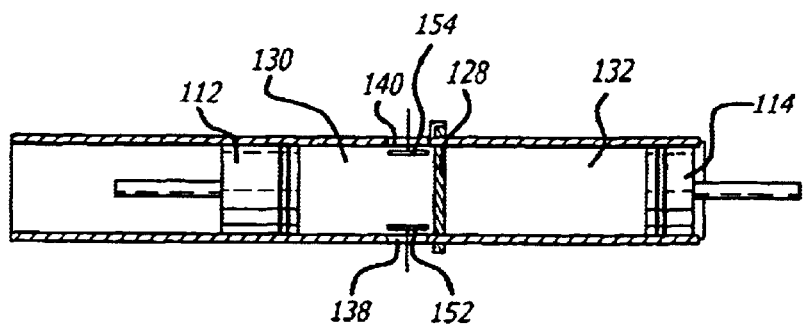
FIG. 3 is a schematic illustration of a cross section of a single cylinder of a second illustrative embodiment of the present invention.

FIG. 3 is a schematic drawing of the cylinder of a second illustrative embodiment of the regenerated engine of the present invention. This drawing is not as detailed as that of FIG. 1, with the only substantial differences from FIG. 1 being: (1) this engine has the intake ports 138 located adjacent to the exhaust ports 140 and near the regenerator 128, (2) one or more intake poppet valves 152 are used to control the opening and closing of the one or more intake ports, and (3) one or more exhaust poppet valves 154 are used to control the opening and closing of the one or more exhaust ports. These intake and exhaust passages and associated valves could also be ports operated by a sleeve valve, or other means commonly employed to control flow through passages. One or more ports with covering valves may be utilized for each of the exhaust and intake passages. Finally, since the axial forces acting on the cylinder are small, it is also feasible to "break" the cylinder in the cold volume such that it can be pulled apart when desired to provide an opening for the exchange of gases.

The drive mechanism for this embodiment of the invention is not shown in FIG. 3, however it may be similar or identical to that of FIG. 1. The only difference would be in the shape of the surface of the barrel cam, which is a detail not shown in either drawing.

FIG. 4A to 4I depict the operation of this engine in an enhanced gas exchange mode. In this embodiment, as will be described hereinbelow, the cold piston moves specifically and primarily for the purpose of forcing gas out the exhaust ports and drawing gas in through the intake ports. The primary difference between the operation of the engine during the conventional gas exchange cycle and the enhanced gas exchange cycle is the addition of two extra cold piston strokes during the enhanced gas exchange cycle to facilitate improved gas exchange in the cold volume. Thus, the operational steps depicted in FIGS. 4A through 4F are generally the same as those depicted in FIGS. 2A through 2F.

In the exemplary embodiment depicted in FIGS. 4A through 4I the cylinder configuration of FIG. 3 is used wherein the ports are opened and closed by poppet valves. For simplicity, the valves are not presented in FIGS. 4A through 4I. When a port is opened, it is shown as an opening in the cylinder wall. When a port is closed, it is not shown. It is to be understood that the enhanced gas exchange cycle depicted in FIGS. 4A through 4I can also be operated with an engine structure which employs a sleeve valve to open and close the intake and exhaust ports. Furthermore, the conventional gas exchange cycle depicted in FIGS. 2A through 2H can be operated with the engine structure of FIG. 3 as well as that of FIG. 1.

Other design approaches, such as different diameter cylinders encompassing the hot volume 132 and the cold volume 130, or different valving approaches, can be utilized without changing these basic processes or departing from the inventive concept. In reality, due to mechanical limitations, there will typically be some overlap in these processes presented in FIGS. 4A–4I.

Figure 4A:
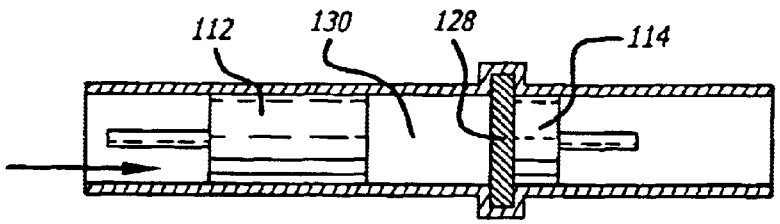
FIG. 4 depicts the operating sequence for the embodiment of FIG. 3.
Figure 4B:
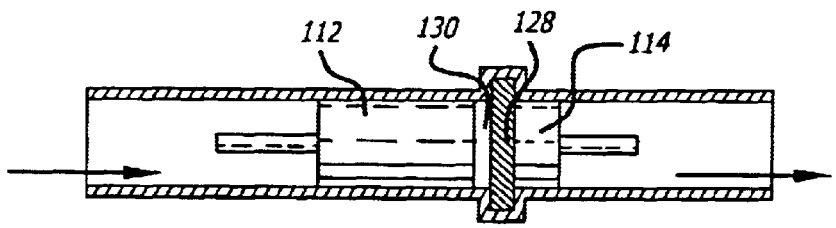

FIGS. 4A through 4F depict engine configurations similar to those depicted in FIGS. 2A through 2F. FIG. 4A presents the engine configuration at the start of the compression stroke. FIG. 4B depicts the cold piston 112 close to the regenerator 128 while the hot piston 114 has remained nearly stationary at, or very near to, its closest position to the regenerator 128. As with FIG. 2B, this is the time of maximum gas compression in the cylinder. Between FIGS. 4B and 4C, the cold piston 112 continues its inward motion and the hot piston 114 begins to move away from the regenerator 128. As with FIGS. 2B and 2C, this is referred to as the regenerative heating process.

Figure 4C:
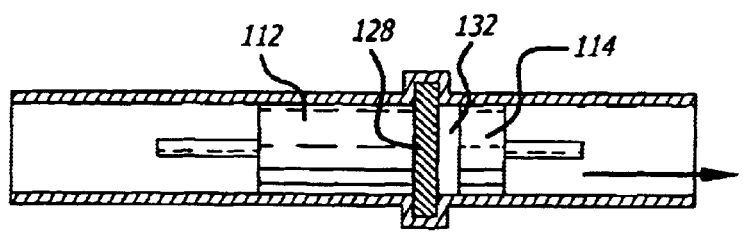
Figure 4D:
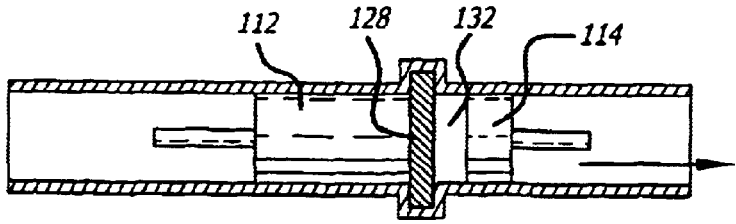
Figure 4E:
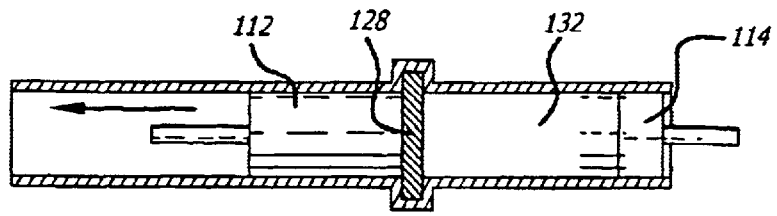

The cold piston 112 then remains nearly stationary and the hot piston 114 continues its motion away from the regenerator 128, expanding the hot volume 132 as shown from FIGS. 4C to 4D and then to 4E. Sometime shortly after fuel injection begins (FIG. 4D), the very high temperature of the working fluid in the hot volume 132 causes the fuel to ignite resulting in the hot side expansion or hot piston power stroke. The end of this hot side expansion is depicted in FIG. 4E.

As with FIGS. 2E and 2F, FIGS. 4E and 4F depict the hot piston 114 being maintained nearly stationary at its outward-most position and the cold piston 112 being moved to its outwardmost position. Again, the present invention does not specifically depend on this particular hot and then cold piston expansion process, as There may be some applications or engine operating conditions (e.g., very lightly loaded engines) in which the simultaneous piston motion expansion process will be preferred.

Figure 4F:
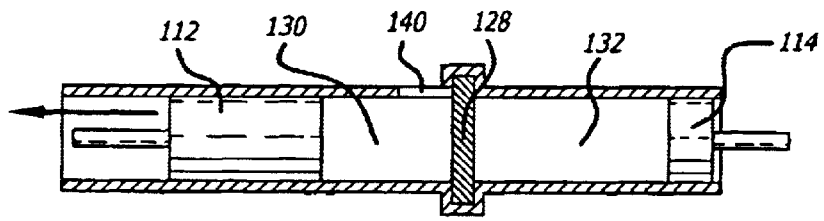

Like FIG. 2F, FIG. 4F shows the exhaust ports 140 which are opened by their poppet valves as the cold piston 112 nears its outward-most position. This results in the blow-down of the cylinder gases. During the expansion in the cold volume 130 and during blowdown some of the working fluid travels from the hot volume 132 to the cold volume 130, passing through the regenerator 128. As it passes through the gas transfers thermal energy to the regenerator 128. This is referred to as the first part of the regenerative cooling process. This motion of the cold piston 112 depicted between FIGS. 4E and 4F is also referred to as the cold side expansion.

Figure 4G:
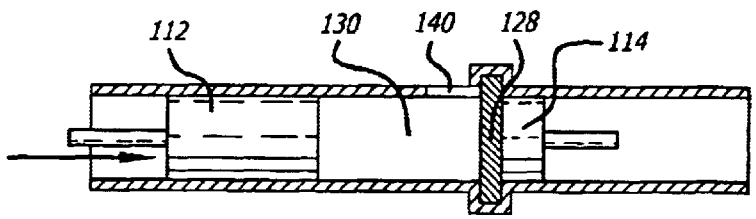

Between the positions depicted in FIGS. 4F and 4G, the hot piston 114 moves from near its outward-most position to near its most inward position, adjacent to the regenerator 128. This motion results in additional mass flow through the regenerator 128 and heat transfer to it. This hot piston stroke is referred to as the second part of the regenerative cooling process. During this hot piston stroke, the cold piston 112 can remain nearly stationary near its outward-most position. Alter natively, the cold piston 112 may begin its inward motion toward the regenerator 128. Inward motion of either pistons forces exhaust gases out of the exhaust port 140.

The next step (FIGS. 4G to 4H) comprises the exhaust stroke. The cold piston 112 moves from near its outward-most position to a position closer to the regenerator 128. The hot piston 114 has already moved to its inwardmost position, or else completes its motion during the cold piston's exhaust stroke. It is important that the hot piston 114 be very close to the regenerator by the end of the cold piston's exhaust stroke, in order to eliminate as much as possible of the exhaust gases from the hot volume. Alternatively, if extra exhaust gas retention is desired (e.g., to minimize $NO_x$) then the hot piston 114 need not be at its inwardmost position.

During the cold piston's exhaust stroke, the exhaust port or ports 140 remain open. In this embodiment, this requires that the exhaust poppet valves remain open. The intake ports are closed. Exhaust gases are thus forced out of the cylinder. It is important to recognize that this exhaust stroke of the cold piston 112 need not be a full stroke, that is, the cold piston does not have to move completely to its inwardmost position. The barrel cam drive mechanism of this embodiment provides the capability for this exhaust stroke of the cold piston 112 to be shorter than its previous stroke, the compression stroke of FIGS. 4A to 4B. Thus the cold piston 112 need not go so far as to impact the inward opening poppet valves controlling the intake and exhaust ports 138 and 140.

Figure 4H:
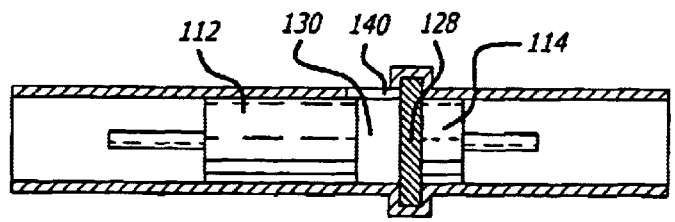
Figure 4I:
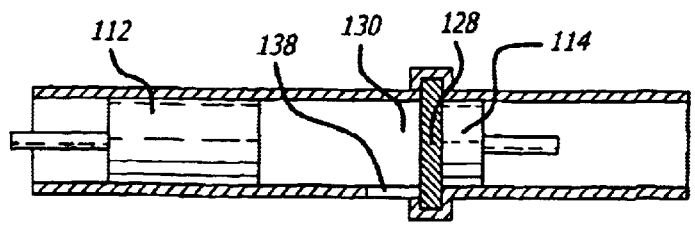

Finally, as the cold piston 112 approaches the end of its exhaust stroke, the intake poppet valves begins to open the intake ports 138 and the exhaust poppet valves begin to close the exhaust ports 140. Some degree of overlap in these actions is generally desirable or unavoidable. Then, the cold piston 112 moves outward from the inwardmost position of its exhaust stroke as shown in FIGS. 4H to 4I. This cold piston stroke is referred to as the intake stroke. Before or early in this intake stroke the exhaust valves complete their closing of the exhaust ports 140, and the intake valves complete their opening of the intake ports 138. The hot piston 114 remains near to its inwardmost position throughout the intake stroke. As the cold piston 112 performs this intake stroke, fresh working fluid is drawn into the cylinder through the open intake port 138. Finally, near the time that the cold piston 112 completes this intake stroke, the intake valves close the intake ports 138 and the compression stroke begins. This returns us to the situation depicted in FIG. 4A.

All of these valve actions can be varied without departing from the basic teachings of this invention. The degree of valve overlap can be varied or eliminated. The intake valve closing may be delayed so as to partially expel some of the working fluid in a manner commonly employed to increase the degree of expansion of the working fluid over the degree of compression (i.e., a "Miller cycle"). Another way to accomplish the Miller cycle with this engine is to reduce the intake stroke so that the cold piston does not attain its most outward position before starting its inward compression stroke.

For both the conventional gas exchange and enhanced gas exchange embodiments of this invention, it should be understood that alternates methods of introducing fuel into the hot volume can be utilized and still remain within the scope of the invention. For example, (1) fuel can be directly injected into the hot volume, (2) fuel can be injected into the cold volume and subsequently passed through the regenerator, or (3) fuel can be introduced into the working fluid prior to the working fluid's entry into the cylinder and then subsequently passed through the regenerator and into the hot volume. Fuel injectors used to practice the present invention may include any device which introduces fuel into the cylinder, including vaporizing, atomizing, hydraulic and pneumatic devices.

For some fuels with large ignition delays (e.g lighter hydrocarbons such as propane and natural gas) and for some operating conditions (e.g., starting, idling, and lightly loaded), it may be necessary or advantageous to provide an ignition source in the hot cylinder, such as a spark plug or a glow plug. In some situations and with some fuels it may be possible to utilize the hot surfaces of the regenerator, the compressional heating, or both to ignite a premixed fuel and air mixture.

One important feature of the invention disclosed herein is the specified motion of the pistons. Proper motion can be essential if a viable engine is to be produced. For example, the hot piston preferably remains very close to the regenerator during the compression process. Otherwise, gases will be forced through the regenerator, thereby being heated, during compression. This increases the compression work required of the engine and degrades power and efficiency. Similarly, during the hot piston's expansion stroke, the cold piston preferably remains very close to the regenerator. If the cold piston moves away from the regenerator, hot gases will be drawn through the regenerator and into the cold volume. In the process these hot gases will be cooled by the regenerator. Thus thermal energy will be extracted too soon and very hot gases will be drawn into the regenerator. This will degrade performance and probably destroy the regenerator. The invention disclosed herein specifies this critical piston motion and provides one means by which this motion can be accomplished.

Figure 5:
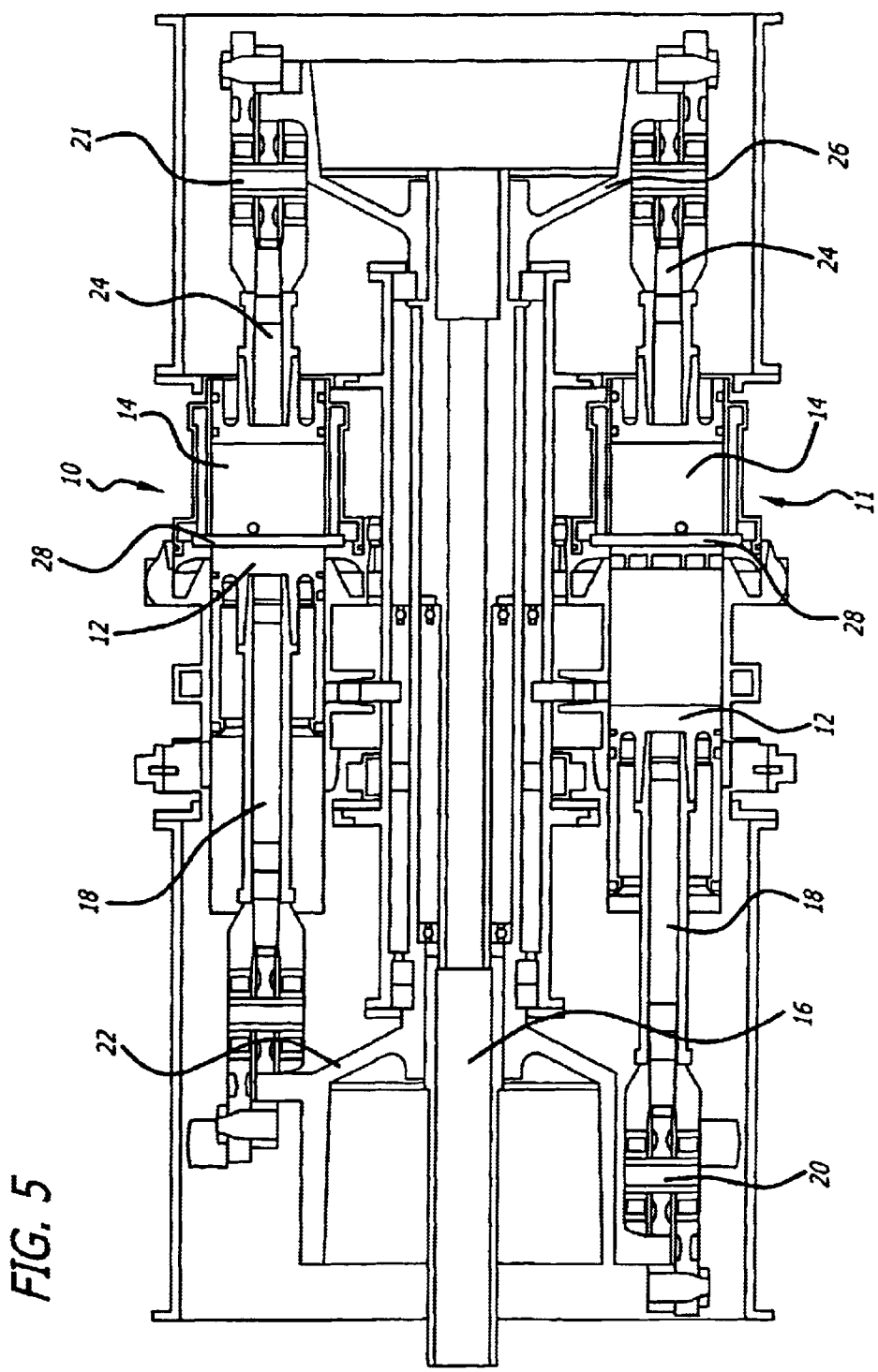
FIG. 5 is a longitudinal section of one embodiment of the engine assembly of the present invention.

FIG. 5 is a longitudinal section of one embodiment of the engine assembly of the present invention. This particular embodiment utilizes the conventional gas exchange cycle described above with reference to FIGS. 2A through 2H. Only minimal and obvious design changes, as described in this disclosure, are required for operation in an enhanced gas exchange cycle described above with reference to FIGS. 4A to 4I. This conventional gas exchange embodiment utilizes a pair of barrel cams 22 and 26 to provide the unusual and highly non-sinusoidal pistons' motions required by this engine. The highly flexible motion that can be provided with barrel cams make them especially applicable for use on this engine. The embodiment of FIG. 5 comprises four cylinders, cylinders 10 and 11, as well as two cylinders which are out of the plane of the cross-sectional view. As described above with respect to cylinder 10 of FIG. 1, cylinders 10 and 11 are closed at both ends by opposed pistons 12 and 14. Cold piston 12 is connected to a power output shaft 16 by a piston rod 18, roller assembly 62, and barrel cam 22. hot piston 14 is connected to power output shaft 16 by another piston rod 24, another roller assembly 64, and barrel cam 26. Barrel cams 22 and 26 are used to convert the linear motion of pistons 12 and 14 to the rotating motion of power output shaft 16. As shown in FIG. 1, each cylinder is divided into two parts by a regenerator 28 and thereby has a changeably sized cold volume 30 between the cold piston 12 and the regenerator 28 and a changeably sized hot volume 32 between the regenerator 28 and the hot piston 14.

Figure 6:
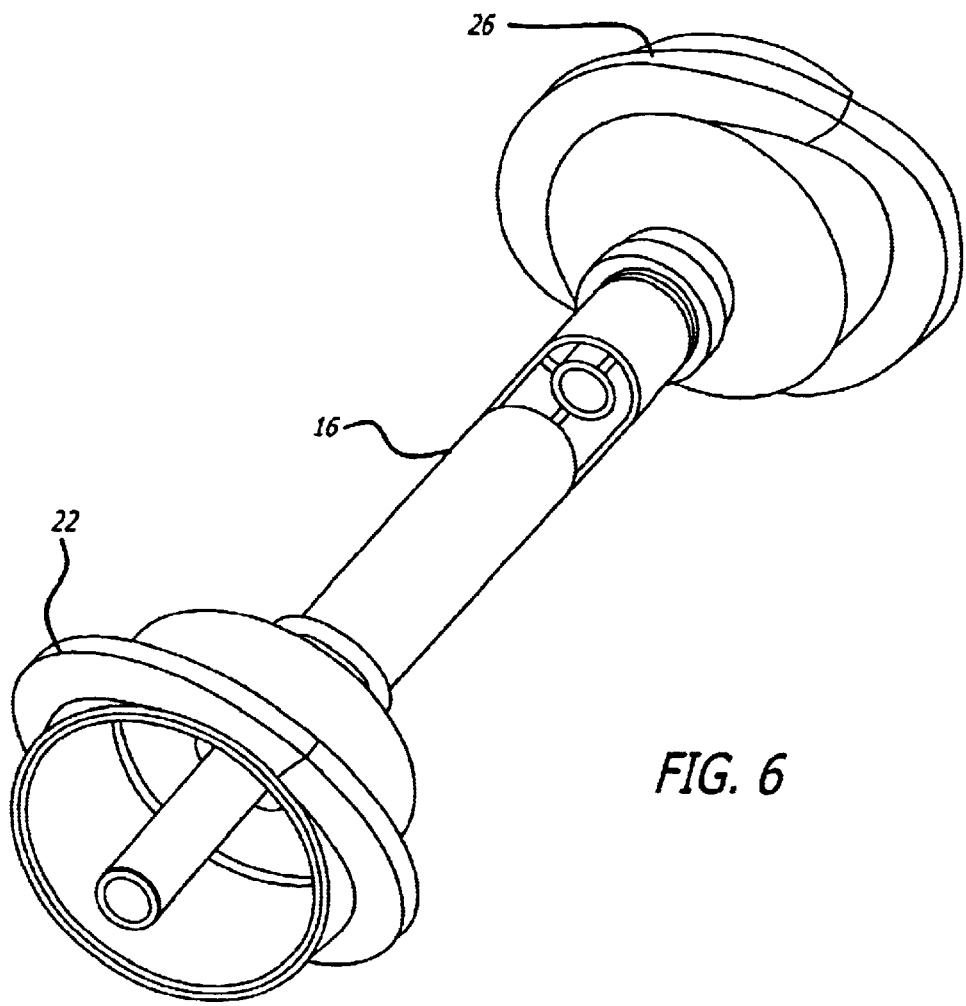
FIG. 6 is a perspective view of a cam assembly that can be used in the present invention.

FIG. 6 illustrates a perspective view of cam assembly 20 comprising barrel cams 22 and 26 on opposite ends of shaft 16. Cams 22 and 26 are contoured to provide the periodic piston motion disclosed above.

Figure 7:
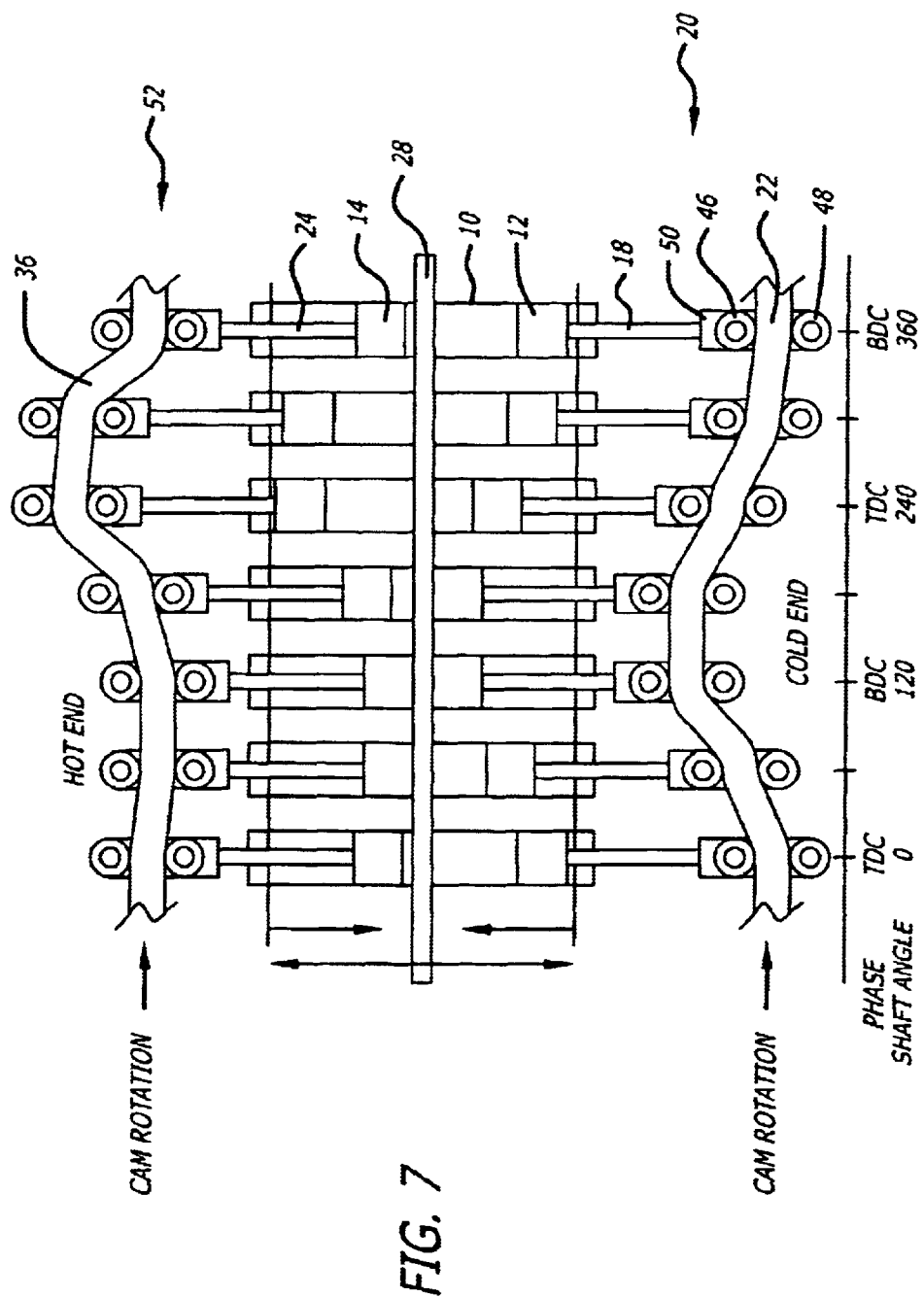
FIG. 7 is a planar schematic diagram illustrating the piston reciprocation provided by cam assembly that can be used in the present invention.

FIG. 7 is a planar schematic diagram illustrating the particular non-sinusoidal piston motion and phasing provided by cam assembly 20. Cam 22 provides motion to cold piston 12 and piston rod 18 via follower assembly 20. Follower assembly 20 comprises loaded roller 46 and slack side roller 48 mounted on yoke 50. Following the bottom of the schematic from left to right we see the particular cam geometry that is used to provide the very specific positions of cold piston 12, relative to regenerator 28, through three hundred sixty degrees of shaft angle. Similarly, the top of the schematic shows cam 26 providing motion to hot piston 14 and piston rod 24 via follower assembly 52 which also comprises a loaded roller and a slack side roller mounted on a yoke. As with the cold side of the cylinder, following the schematic form left to right illustrates how the geometry of cam 26 provides the specific motion of hot piston 14, with respect to the regenerator 28, though three hundred sixty degrees of shaft angle. One of ordinary skill in the art would appreciate how to vary the motion of either or both pistons 12 and 14 by varying the geometry of cams 22 and 26, respectively.

While the barrel cam comprises an excellent drive mechanism by which to provide the very unusual piston motions required by the regenerated cycle, other means exist for accomplishing the same or very similar motion. This invention may be practiced with alternate drive mechanisms which provide non-sinusoidal piston motion having dwell at each end of the stroke.

Obviously, many modifications and variations of the present invention are possible in light of the above teachings. It is, therefore, to be understood that within the scope of appended claims, the invention may be practiced otherwise than as specifically described herein.

What is claimed is:

1. A regenerated internal combustion engine comprising:
    at least one cylinder, closed at one end by a movable hot piston and closed at the other end by a movable cold piston, said pistons moving in a reciprocating manner and connected to a power output shaft;
    a thermal regenerator located within said cylinder between said pistons, said regenerator dividing said cylinder into a hot volume and a cold volume, said hot volume lying between said regenerator and said hot piston, and said cold volume lying between said regenerator and said cold piston;

at least one exhaust port on said cylinder to permit the flow of exhaust fluid out from said cylinder, said exhaust port located between said cold piston and said thermal regenerator; and at least one intake port on said cylinder to permit the flow of fresh working fluid into said cylinder, said intake port located between said cold piston and said exhaust port.

2. The engine of claim 1 wherein said cylinder cold volume has a first end proximal to said regenerator and a second end distal from said regenerator and said at least one exhaust port is located at said first cylinder end and said at least one intake port is located at said second cylinder end.

3. The engine of claim 2 wherein said at least one intake port is configured to communicate with said cold volume when said cold piston is at said second end and is configured not to communicate with said cold volume when said cold piston is at said first end.

4. The engine of claim 1 further comprising a sleeve valve which covers and uncovers said exhaust port.

5. The engine of claim 1 further comprising poppet valves capable of opening and closing said one or more intake ports and said one or more exhaust ports.

6. The engine of claim 1 wherein said pistons are connected to said output shaft by one or more barrel cams.

7. The engine of claim 1 further comprising a fuel injector.

8. A regenerated internal combustion engine comprising:
at least one cylinder, closed at one end by a movable hot piston and closed at the other end by a movable cold piston, said pistons moving in a reciprocating manner and connected to a power output shaft by one or more barrel cams having geometries which are contoured to provide to said hot piston and to said cold piston non-sinusoidal motion having specified dwell periods;

a thermal regenerator located within said cylinder between said pistons, said regenerator dividing said cylinder into a hot volume and a cold volume, said hot volume lying between said regenerator and said hot piston, and said cold volume lying between said regenerator and said cold piston;

at least one exhaust port on said cylinder to permit the flow of exhaust fluid out from said cylinder; and at least one intake port on said cylinder to permit the flow of fresh working fluid into said cylinder.

9. The engine of claim 8 wherein said cams are contoured to provide relatively long dwell periods to said pistons.

10. The engine of claim 8 wherein said cams are contoured to provide piston motion which varies substantially from sinusoidal motion.

11. A method for operating an internal combustion engine having a fixed regenerator comprising the following steps:
providing an internal combustion engine comprising:
at least one cylinder, said cylinder closed at one end by a movable hot piston and closed at the other end by a movable cold piston, and further comprising a thermal regenerator located within said cylinder between said pistons and dividing said cylinder into a hot volume and a cold volume;
one or more intake ports;
one or more exhaust ports;
one or more fuel injectors; and
compressing a working fluid primarily in said cold volume and passing the working fluid from said cold volume to said hot volume through said regenerator;

injecting fuel into said hot volume, initiating combustion and expanding the combusting fluid in said hot volume;

transferring a portion of the working fluid to said cold volume through said regenerator;

expanding said portion of the working fluid in said cold volume while maintaining said hot volume's size nearly constant;

expelling a portion of the working fluid in said cold volume through said exhaust ports along with the transfer of additional working fluid from said hot volume, through said regenerator, and into said cold volume while maintaining said hot volume's size nearly constant;

transferring most of the remainder of the working fluid in said hot volume through said regenerator into said cold volume; and partially exchanging the working fluid via said intake ports and said exhaust ports.

12. The method of claim 11 wherein the step of partially exchanging the working fluid further comprises the following steps:
maintaining or moving said hot piston to its most inward position and maintaining it there;
closing said exhaust ports; and
moving said cold piston to its most outward position thereby drawing fresh working fluid into the cylinder through said intake ports.

13. The method of claim 11 wherein the steps of expelling a portion of the working fluid, transferring most of the remainder of the working fluid, and partially exchanging the working fluid substantially overlap each other.

14. The method of claim 11 wherein the steps of expelling a portion of the working fluid, transferring most of the remainder of the working fluid, and partially exchanging the working fluid are substantially simultaneous steps.

15. The method of claim 11 wherein said intake ports and said exhaust ports are equipped with appropriate valves to facilitate gas exchange.

16. The method of claim 11 wherein said intake ports and said exhaust ports are controlled primarily by motion of the cold piston.

17. The method of claim 16 wherein said intake ports and said exhaust ports are controlled by motion of the cold piston and by valves external to the cylinder.

18. The method of claim 11 wherein said partial exchange of the working fluid via said intake port and said exhaust port is accomplished by the following scavenging process;
opening said exhaust ports;
opening said intake ports;
maintaining said hot piston nearly stationary near to its most inward position and maintaining said cold piston near to its most outward position; and
permitting or causing fresh, pressurized working fluid to enter said cylinder through said intake ports and to force the working fluid out of said cylinder through said exhaust ports.

19. The method of claim 11 wherein the step of partially exchanging the working fluid further comprises the following steps:
maintaining or moving said hot piston to its most inward position and maintaining it there;
moving said cold piston from its most outward position to an inward position, thereby forcing working fluid out of said exhaust ports;
closing said exhaust ports and opening said intake ports; and moving said cold piston to its most outward position thereby drawing fresh working fluid into the cylinder through said intake ports.

20. The method of claim 19 wherein the step of closing said exhaust steps and opening said intake ports further comprises closing said exhaust ports prior to opening said intake ports.

21. The method of claim 11 wherein the step of compressing a working fluid further comprises moving said cold piston from near its most outward position to near its most inward position while maintaining said hot piston at or near to its most inward position.

22. The method of claim 11 wherein the step of expanding the working fluid in said hot volume comprises moving said hot piston from near its most inward position to its most outward position while maintaining said cold piston at or near to its most inward position.

23. The method of claim 11 wherein the step of transferring most of the remainder of the working fluid is completed prior to the step of partially exchanging the working fluid via said intake ports and said exhaust ports.

24. The method of claim 11 wherein the step of transferring most of the remainder of the working fluid occurs partially or completely during the step of partially exchanging the working fluid via said intake ports and said exhaust ports.

25. The method of claim 11 further comprising the step of providing one or more barrel cams connecting said pistons to an output shaft.

26. A method for operating an internal combustion engine having a fixed regenerator comprising the following steps:
   providing an internal combustion engine comprising:
      at least one cylinder, said cylinder closed at one end by a movable hot piston and closed at the other end by a movable cold piston, and further comprising a thermal regenerator located within said cylinder between said pistons and dividing said cylinder into a hot volume and a cold volume;
      one or more intake ports;
      one or more exhaust ports;
      one or more fuel injectors; and
   compressing a working fluid primarily in said cold volume and passing the working fluid from said cold volume to said hot volume through said regenerator;
   injecting fuel into said hot volume, initiating combustion and expanding the combusting fluid in said hot volume;
   transferring a portion of the working fluid to said cold volume through said regenerator;
   expanding said portion of the working fluid in said cold volume while maintaining said hot volume's size nearly constant;
   transferring most of the remainder of the working fluid in said hot volume through said regenerator into said cold volume; and
   opening said exhaust ports;
   opening said intake ports;
   maintaining said hot piston nearly stationary near to its most inward position and maintaining said cold piston near to its most outward position; and
   permitting or causing fresh, pressurized working fluid to enter said cylinder through said intake ports and to force the working fluid out of said cylinder through said exhaust ports.

27. A method for operating an internal combustion engine having a fixed regenerator comprising the following steps:
   providing an internal combustion engine comprising:
      at least one cylinder, said cylinder closed at one end by a movable hot piston and closed at the other end by a movable cold piston, and further comprising a thermal regenerator located within said cylinder between said pistons and dividing said cylinder into a hot volume and a cold volume;
      one or more intake ports;
      one or more exhaust ports;
      one or more fuel injectors; and
   compressing a working fluid primarily in said cold volume and passing the working fluid from said cold volume to said hot volume through said regenerator;
   injecting fuel into said hot volume, initiating combustion and expanding the combusting fluid in said hot volume;
   transferring a portion of the working fluid to said cold volume through said regenerator;
   expanding said portion of the working fluid in said cold volume while maintaining said hot volume's size nearly constant;
   expelling a portion of the working fluid in said cold volume through said exhaust ports along with the transfer of additional working fluid from said hot volume, through said regenerator, and into said cold volume while maintaining said hot volume's size nearly constant;
   transferring most of the remainder of the working fluid in said hot volume through said regenerator into said cold volume;
   maintaining or moving said hot piston to its most inward position and maintaining it there;
   closing said exhaust ports; and
   moving said cold piston to its most outward position thereby drawing fresh working fluid into the cylinder through said intake ports.

28. A method for operating an internal combustion engine having a fixed regenerator comprising the following steps:
   providing an internal combustion engine comprising:
      at least one cylinder, said cylinder closed at one end by a movable hot piston and closed at the other end by a movable cold piston, and further comprising a thermal regenerator located within said cylinder between said pistons and dividing said cylinder into a hot volume and a cold volume;
      one or more intake ports;
      one or more exhaust ports;
      one or more fuel injectors; and
   compressing a working fluid primarily in said cold volume and passing the working fluid from said cold volume to said hot volume through said regenerator;
   injecting fuel into said hot volume, initiating combustion and expanding the combusting fluid in said hot volume;
   transferring a portion of the working fluid to said cold volume through said regenerator;
   expanding said portion of the working fluid in said cold volume while maintaining said hot volume's size nearly constant;
   expelling a portion of the working fluid in said cold volume through said exhaust ports along with the transfer of additional working fluid from said hot volume, through said regenerator, and into said cold volume while maintaining said hot volume's size nearly constant;
   transferring most of the remainder of the working fluid in said hot volume through said regenerator into said cold volume;

maintaining or moving said hot piston to its most inward position and maintaining it there;

moving said cold piston from its most outward position to an inward position, thereby forcing working fluid out of said exhaust ports;

closing said exhaust ports and opening. said intake ports; and moving said cold piston to its most outward position thereby drawing fresh working fluid into the cylinder through said intake ports.

29. The engine of claim 8 wherein said cams are contoured to provide dwell periods at each end of each piston's stroke.

* * * * *